INVENTOR.
KARL ÅKE SALLOW
BY Bailey, Stephens &
Huettig

United States Patent Office 3,278,160
Patented Oct. 11, 1966

3,278,160
AUTOMATIC ELECTRICAL CONTROLS FOR A WINCH, CAPSTAN OR THE LIKE
Karl Åke Sallow, Lovstaplatsen 4, Vasteras, Sweden
Filed Sept. 15, 1964, Ser. No. 396,677
Claims priority, application Sweden, Sept. 23, 1963, 10,349/63
3 Claims. (Cl. 254—173)

The present invention relates to a winch, a capstan or the like and a drive motor coupled to it, intended to exert alternately a braking and a torsional moment during the paying out and reeling in respectively of cable during mooring of ships or similar operations.

The British Patent 815,544 refers to a gear capstan or the like with mechanical coupling between a cable drum and a drive motor which is arranged to exert a working moment substantially independent of the number of revolutions and direction of rotation, but adjustable and acting in one direction. The object of this invention was accomplished by arranging an electrical member measuring the speed and direction of rotation of the drive motor so that during reeling in of cable with a number of revolutions close to or slightly above zero the torsional moment of the motor was decreased intermittently by altering its field current. This arrangement may be specially used with moored ships and its purpose is specially to compensate for the mechanical loss in energy in the capstan (winch) during the change-over from paying out to reeling in and vice versa.

Recently it has also been desired to make use of similar ship winches during the retardation of ships at the quay. For example during the paying out (lowering) it may be desirable to be able to pay out at a speed up to about 4 knots, which means that during controlled electrical braking the winch must be able to pay out the cable with a speed of several times the normal speed. The normal nominal speed usually corresponds to a cable speed of about 1 knot.

The present invention refers to a capstan which can be used in connection with similar moorings and constitutes an economical and effective solution of this problem. The invention is characterised in that a measuring member measuring the armature current, moment or speed of a drive motor is arranged at least during the paying out of the cable with a value different from zero to decrease intermittently the braking moment of the motor by altering its field current and armature current characteristics. By this arrangement the need of a direction sensing member can be eliminated and at the same time compensation from the point of view of the moment for the saturation of the generator can be produced, the use of which connection would otherwise be impossible at greater paying out speeds. By "armature current characteristics" we mean the changing of armature current at different loads.

Figure 1:
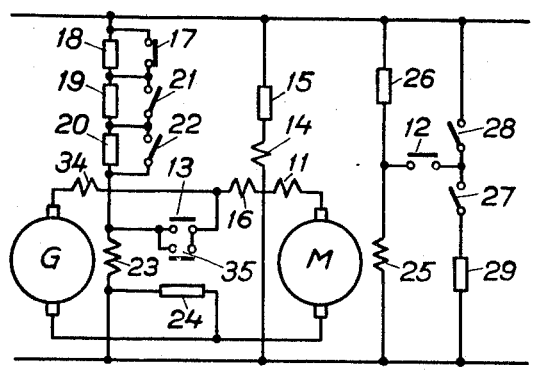
Figure 2:
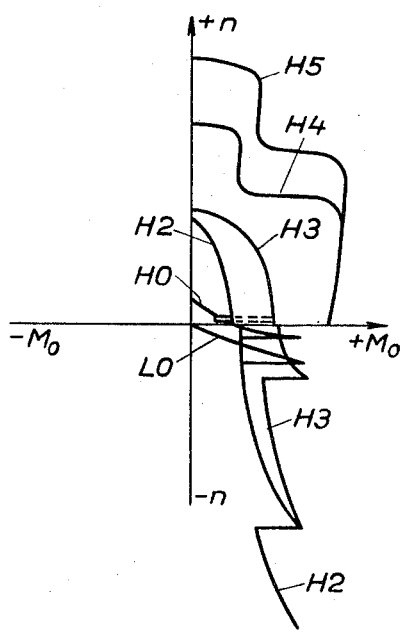
Figure 3:
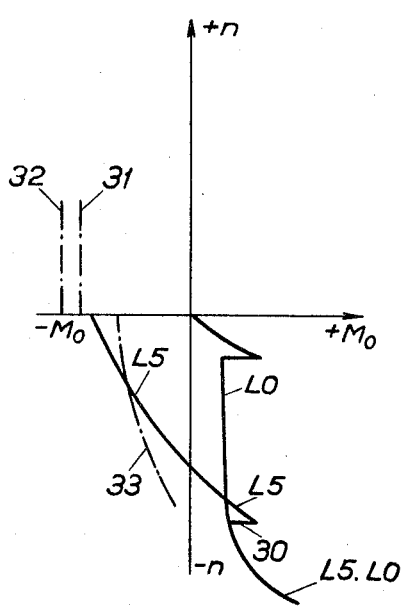

The invention can be explained more in the enclosed figures, of which FIGURE 1 shows a circuit diagram for an embodiment according to the invention, while FIGURES 2–3 show some revolution-moment diagrams for the same device.

G and M are a direct current generator and a direct current motor respectively in a Ward-Leonard unit for a mooring winch according to the invention, the generator is a compound generator with a counteracting series winding 34, partly separate and partly self-magnetized. In the armature circuit of the motor (M) there is a current coil 11 (series winding) for a relay with the contacts 12 of the self-magnetization circuit of the generator and 13 in the field circuit of the motor (M) (fed separately from a direct current network +—) and in a self-magnetization circuit for the generator, respectively. The relay has also a shunt winding 14, supplied over a series resistance 15 from the direct current network. The voltage across this winding 14 is independent of armature current or voltage in the motor (M) and the number of ampere turns ($N_fI_f$) is so adjusted with regard to magnitude and direction that certain undesirable relay energizations (see below) are avoided.

In the armature circuit the coil 16 of the relay is series coupled (pick-up value for example 200 a.), whose contact 17 lies in the separately magnetizing circuit of the generator (G), whose field winding 23 can be the same as or different from that included in the self-magnetizing circuit. The separate magnetization of the generator (G) is controlled by a number of series-connected resistances 18, 19, 20, shunted by the relay contact and, the two contacts 21, 22, belonging to the manoeuvre control device, respectively. In the self-magnetizing circuit of the generator (G) the contact 13 of the relay 11–14 and a series resistance 24 are included along with the field winding 23.

The motor M is coupled in different steps H 0–3 for reeling in (hoisting) and in a number of steps (L 0–5) for paying out (lowering) by means of a manually operated manoeuvre control device (not shown). In some of the positions the contacts 21, 22, which are connected with said device, are closed.

The field circuit to the motor (M) includes, in addition to the field winding 25, a series resistance 26 for coupling in to the direct current network. Parallel to this circuit a control contact 27 is connected in series with a resistance 29 and a corresponding control contact 28. To the last mentioned circuit a cross connection is connected through the relay contact 12. The manoeuvre contact 27 is adapted to control the operation in a number of steps (H 0–3) to close for reeling in (hoisting) and a number of steps (L 0–5) for paying out (lowering) and the control contact 28 is adapted to control the operation with a number of steps, in this case two (H 4–5) for reeling in with a greater moment for the motor. The contacts 27 and 28 are operated by the control device and are closed.

The device functions in the following way:
During the first reeling-in step (H0) the field circuit of the motor is closed across the resistance 26. The contact 12 is open as are also the contacts 21 and 22 and contact 13 in the self-magnetizing circuit in the generator. During step H 1–3 the current never reaches the pick-up value for relay 11–14. In FIGURE 2 this is illustrated for H2 and H3 during the reeling in, that is positive $n$. During steps H 1–3 for reeling in the contacts 21 and 22 in turn are closed by the control device for the magnetizing of the generator, by means of which this is amplified. With increased load on the winch a certain current control is reached by winding 11 (in co-operation with the winding 14), and the relay contacts 12 and 13 respectively are closed. In this way the self-magnetizing is coupled in for the generator (G) and during the last steps (H 4–5) for reeling in (hoisting) the flux in the motor is therefore increased (for example from 80% to 100%) whereby full pulling power is obtained.

H0, H1 (not shown in FIG. 2), H2, H3, H4 and H5 are six different reeling steps (positions of the control device), each with different combinations of open and closed contacts in order to get the curves torque (M)—speed ($n$) as shown in FIG. 2. H1 lies between H0 and H2 and is not shown in said figure. H 1–3 means H1, H2 and H3, H 0–1 means H0 and H1, etc.

If the winch is forced to pay out cable on step H 0–3, i.e the motor is forced to rotate backwards (the number of revolutions $n$ becomes negative, see FIG. 2), a braking current ($I_1$) through relay coil 11 at a certain paying out speed is produced, for example 120 a. The number of ampere turns $N_1 \cdot I_1$ coincides with the number of ampere turns $N_f \cdot I_f$ of the shunt winding 14 and relay 11–14 picks up and the contacts 12 and 13 are closed. By this means the parallel resistance 29 is coupled in across the field winding 25 of the motor, whereby its flux decreases, for example by 50%. At the same time the self-magnetizing is coupled in for the generator (G), which circuit is not normally coupled in at step H 0–1. On step H 2–3 the self-magnetizing is coupled in by a contact 35 and thereby the braking moment of the motor decreases at a certain number of revolutions.

Contact 27 is closed by the control device in steps H0, H1, H2 and H3 and in paying out steps L0, L1, L2, L3, L4 and L5, open in H4 and H5, where contact 28 is closed (open in the other steps).

In step L 0–5 the separate magnetizing is controlled in a corresponding way (see FIG. 3) as in the hoist direction (H steps). The self-magnetizing is not continually coupled in but is controlled by relay contact 13.

During acceleration of the motor (M) in the paying out direction, the current direction becomes reversed through coil 11 compared with reeling in. The number of ampere turns which control the relay 11–14 becomes in this way $N_1 I_1 - N_f I_f$, whereby the relay picks up at a current $I_1^{(32)}$ of 240 a. in the chosen example. During the acceleration period however the current $I_1^{(31)}$ is limited to 200 a. of the current limiting relay 16–17, whereby the energization of relay 11–14 in this speed range is prevented. If the winch is driven with a higher paying out speed than the number of revolutions when the motor is unloaded for the respective paying out steps (L 0–5) a braking current appears, which regulates relay 11–14 in a way similar to that described for step H 0–3, by which the braking moment of the winch sinks to a suitable value. During the decrease of the speed of the ship the brake current decreases and relay 11–14 drops out by means of which the moment decrease disappears and the brake moment increases (see 30 in FIG. 3). The braking process thereby becomes controlled automatically within those limits which can be used practically.

It is, of course, feasible to alter the motor field in several steps, for example by arranging several moment or speed measuring members.

As already partly described, FIG. 2 shows the moment relations during the reeling in steps (H 0–5) for the control contacts 27 and 28. The dashed part of the curve H3 shows the previous moment decrease with the device according to the said patent. By the present invention, as is seen in FIG. 2, a smaller torque takes place at the reversal of rotation direction. At a certain current the relay 11–14 picks up and the flux is decreased and the moment is reduced. In FIG. 2 this phenomenon is shown for steps H3, H2 and H0 during lowering (paying out). During continued lowering the moment increases again somewhat, but by the said relay 11–14 the cable and the motor are prevented from being overloaded and a relatively constant moment is produced even during great paying out speed. For steps H4 and H5 it can be seen in FIG. 2 how the moment increases by the flow increase (picking-up of relay 11–14). The limit of the moment at the lower number of turns is due to the effect of the current limiting relay 16–17.

The importance of the bias (from the shunt winding 14) is illustrated in FIG. 3 during the paying out steps (L0–L5) on the control contact 27. Step L0 is shown in FIG. 2 as well as FIG. 3. With a higher number of turns during lowering (L5 or L0) the moment decreases at a certain value (such as 120 a., co-operating shunt winding 14) when the relay 11–14 picks up and $n-M^0$-curve produces the shown form, that is, overloading of cable and motor is avoided. At the beginning of the acceleration in the lowering direction (L5, 3rd quarter, FIG. 3) the relay 11–14 should pick up without counteracting bias (from 14) but because of the current limiting relay 16–17 this pick-up voltage (for example 240 a.) is not reached, but at a lower value (such as 200 a.) the current limiting relay picks up and the magnetization to the generator is reduced, as is also the armature current. In FIG. 3 are shown the pick-up points for the relay 11–14 at the dashed and dotted line 32 and for the current limiting relay at 31. The relatively vertical direction of, for example, L0 depends on the effect of the self-magnetizing.

The dashed and dotted curve 33 shows how the speed relations should proceed with a polarised relay with low pick-up current. If during accelerated lowering to a higher number of revolutions the flux is greatly increased, a top speed is obtained for a current near zero before the number of revolutions again decreases, a phenomenon desirable to avoid, as much for strength as for psychological reasons.

The number of ampere turns for the bias coil can be made variable for the purpose of producing relay operation with larger or smaller armature current.

The above-mentioned embodiment example can be varied in many ways within the scope of the invention.

It is for example possible to produce the bias to the relay 11–14 from other parts of the set-up, to replace this relay with transistor or transductor units, to measure armature current or moment in a way other than that shown, etc.

I claim:
1. Mooring winch comprising a cable drum and an attached drive motor for giving a braking or driving movement during paying out and reeling in respectively of, the cable, during warping or mooring of a ship, a measuring device for measuring a variable of the motor, and means responsive to the output of said measuring device when such variable reaches a predetermined value for intermittently changing the excitation current and armature current characteristics of the motor to decrease the moment of the motor, said device comprising relay means with a control winding coupled in the armature circuit of the motor, a D.C. generator, the contacts of said relay being in the field circuit of the motor and in the field circuit of said A.C. generator, said relay means including means responsive to the pick-up value of said relay to decrease the field of the motor and to couple in a self-magnetization field of said D.C. generator.

2. Winch in accordance with claim 1, said device comprising a relay with a control winding coupled in the armature circuit of the motor and a biasing winding, the current or voltage of which is substantially independent of the armature current or voltage.

3. Winch in accordance with claim 2, the biasing voltage of the relay having such a direction that the relay is energized at a lower value for the armature current with increasing speed in the paying out direction of the winch than with a decreasing speed in the same direction.

References Cited by the Examiner

UNITED STATES PATENTS 2,443,763   6/1948   Dahlgren _____ 254—172

SAMUEL F. COLEMAN, *Primary Examiner.*